(12) United States Patent
Shiraishi

(10) Patent No.: US 9,607,008 B2
(45) Date of Patent: Mar. 28, 2017

(54) ANALYSIS ENGINE CONTROL DEVICE

(75) Inventor: Nobuhisa Shiraishi, Tokyo (JP)

(73) Assignee: NEC Corporation, Tokyo (JP)

( * ) Notice: Subject to any disclaimer, the term of this patent is extended or adjusted under 35 U.S.C. 154(b) by 383 days.

(21) Appl. No.: 14/128,534

(22) PCT Filed: May 10, 2012

(86) PCT No.: PCT/JP2012/003044
§ 371 (c)(1),
(2), (4) Date: Dec. 20, 2013

(87) PCT Pub. No.: WO2013/001704
PCT Pub. Date: Jan. 3, 2013

(65) Prior Publication Data
US 2014/0114976 A1    Apr. 24, 2014

(30) Foreign Application Priority Data

Jun. 30, 2011 (JP) .................................. 2011-145069

(51) Int. Cl.
*G06N 5/04* (2006.01)
*G06F 17/30* (2006.01)

(52) U.S. Cl.
CPC ......... *G06F 17/30247* (2013.01); *G06N 5/04* (2013.01)

(58) Field of Classification Search
CPC ........................... G06F 17/30247; G06N 5/04
See application file for complete search history.

(56) References Cited

U.S. PATENT DOCUMENTS 4,860,216 A * 8/1989 Linsenmayer .......... G01S 7/412
342/159
5,626,140 A * 5/1997 Feldman .............. G06K 9/6293
600/483
(Continued)

FOREIGN PATENT DOCUMENTS

JP        H08-068651 A      3/1996
JP        2004-029871 A     1/2004
(Continued)

OTHER PUBLICATIONS

International Search Report (ISR) (PCT Form PCT/ISA/210), in PCT/JP2012/003044, dated Jun. 19, 2012.
(Continued)

*Primary Examiner* — Stanley K Hill
*Assistant Examiner* — Thomas Fink
(74) *Attorney, Agent, or Firm* — McGinn IP Law Group, PLLC

(57) ABSTRACT

An analysis engine control device includes: an analysis data selecting for selecting at least two analysis data of a plurality of analysis data that are analysis results obtained by analysis by a plurality of analysis engines, respectively; and an analysis data integration calculating for executing new analysis by using at least two analysis data selected by the analysis data selecting as integration target analysis data. Based on classifications assigned according to one characteristic or each of a plurality of characteristics previously set of the analysis engines, the analysis data selecting selects analysis data obtained by the analysis engines that the classifications are at least partly different from each other, as the integration target analysis data.

13 Claims, 7 Drawing Sheets

(56) References Cited

U.S. PATENT DOCUMENTS

| | | | | |
|---|---|---|---|---|
| 6,009,185 | A * | 12/1999 | DeAngelis | G01S 5/18 367/131 |
| 6,502,082 | B1 * | 12/2002 | Toyama | G06K 9/00234 706/15 |
| 6,862,537 | B2 * | 3/2005 | Skrbina | G01S 13/931 701/301 |
| 7,026,980 | B1 * | 4/2006 | Mavroudakis | G01S 13/723 342/101 |
| 7,151,447 | B1 * | 12/2006 | Willms | G08B 13/1654 250/390.04 |
| 7,180,418 | B1 * | 2/2007 | Willms | G08B 31/00 250/287 |
| 7,701,336 | B1 * | 4/2010 | Willms | G08B 13/1654 250/390.04 |
| 8,364,630 | B1 * | 1/2013 | Hunt | G06N 7/005 706/45 |
| 2002/0028021 | A1 * | 3/2002 | Foote | G06K 9/00758 382/224 |
| 2003/0078754 | A1 * | 4/2003 | Hamza | G01S 13/91 702/150 |
| 2005/0125154 | A1 | 6/2005 | Kawasaki | |
| 2005/0132378 | A1 * | 6/2005 | Horvitz | G06N 7/005 718/104 |
| 2006/0058954 | A1 * | 3/2006 | Haney | G01S 5/0294 701/533 |
| 2007/0096896 | A1 * | 5/2007 | Zingelewicz | G08B 21/12 340/522 |
| 2007/0136224 | A1 * | 6/2007 | Aboutalib | G06K 9/6288 706/52 |
| 2007/0222674 | A1 | 9/2007 | Tan et al. | |
| 2007/0286475 | A1 | 12/2007 | Sekiguchi | |
| 2010/0104199 | A1 * | 4/2010 | Zhang | G06K 9/00798 382/199 |
| 2010/0134285 | A1 * | 6/2010 | Holmquist | G08B 31/00 340/541 |
| 2010/0318641 | A1 * | 12/2010 | Bullard | H04L 43/065 709/223 |
| 2011/0103642 | A1 * | 5/2011 | Wilby | G06K 9/629 382/103 |
| 2011/0172858 | A1 * | 7/2011 | Gustin | B63H 21/213 701/21 |
| 2013/0163879 | A1 * | 6/2013 | Katz | G06T 7/0044 382/195 |
| 2013/0238535 | A1 * | 9/2013 | Leppanen | G06N 99/005 706/12 |
| 2014/0195138 | A1 * | 7/2014 | Stelzig | G08G 1/0116 701/119 |

FOREIGN PATENT DOCUMENTS

| | | |
|---|---|---|
| JP | 2005-141687 A | 6/2005 |
| JP | 2005-165421 A | 6/2005 |
| JP | 2007-240295 A | 9/2007 |
| JP | 2007-310741 A | 11/2007 |
| JP | 2010-049296 A | 3/2010 |
| JP | 2010-509571 A | 3/2010 |
| JP | 2011-047836 A | 3/2011 |
| JP | 2011-075505 A | 4/2011 |
| WO | WO 2009/091029 A1 | 7/2009 |

OTHER PUBLICATIONS

Japanese Office Action dated May 17, 2016 with an English translation thereof.

* cited by examiner

Fig.2

| INFORMATION SOURCE TYPE | OPTICAL SIGNAL | RADIO SIGNAL | ACOUSTIC SIGNAL | TEMPERATURE SIGNAL | ACCELERATION SIGNAL |
|---|---|---|---|---|---|
| CAMERA IMAGE | 1.0 | – | – | – | – |
| OPTICAL ID | 1.0 | – | – | – | – |
| RFID | – | 1.0 | – | – | – |
| UWB | – | 1.0 | – | – | – |
| THERMOGRAPHY | 0.2 | – | – | 0.8 | – |
| ULTRASONIC SENSOR | – | – | 1.0 | – | – |
| ACCELERATION SENSOR | – | – | – | – | 1.0 |

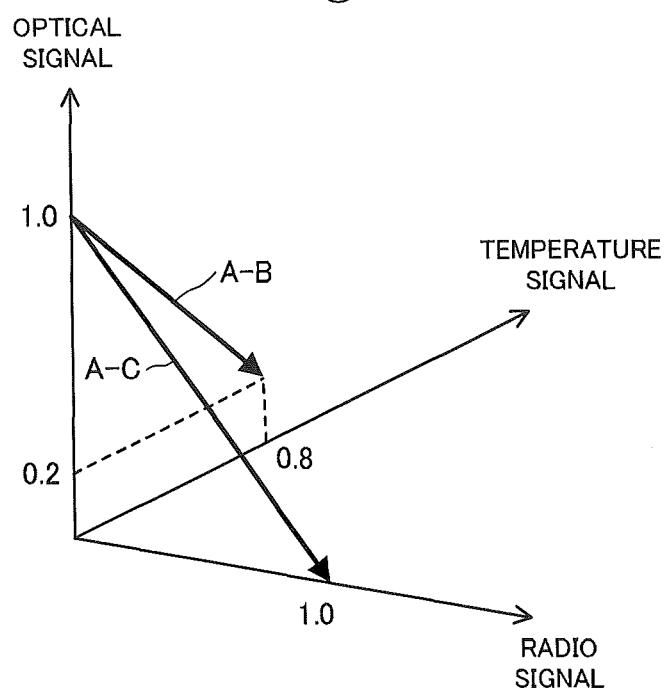

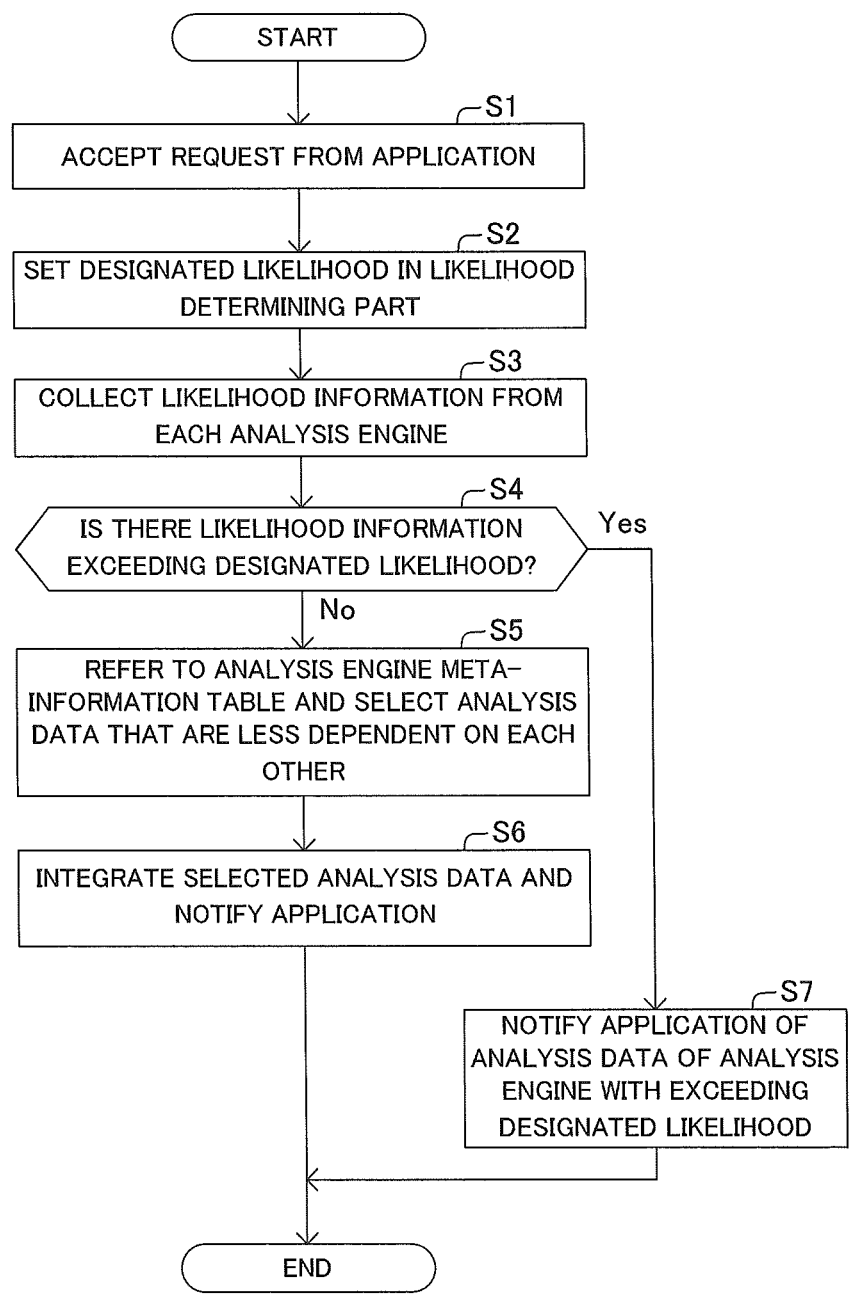

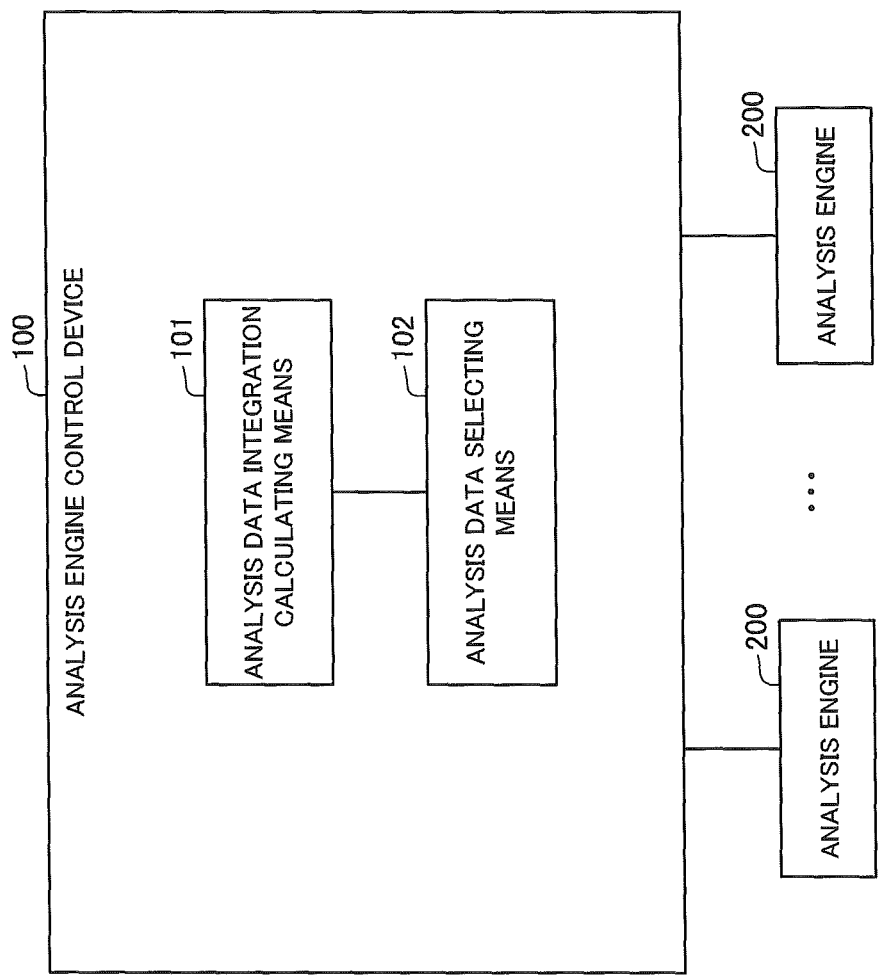

ANALYSIS ENGINE CONTROL DEVICE

TECHNICAL FIELD

The present invention relates to an analysis engine control device, more specifically, relates to an analysis engine control device that integrates the results of analysis by a plurality of analysis engines and outputs a new analysis result.

BACKGROUND ART

Analysis engines that analyze various types of data have been developed with the advance of information processing technology. There are various types of analysis engines, such as an analysis engine that generates location information tracing the flow of a person from moving image data, an analysis engine that specifies a person from still image data, and an analysis engine that generates text data from speech data.

Patent Document 1 discloses a system that realizes combining the results of analysis by a plurality of analysis engines and thereby obtaining an analysis result with higher reliability. To be specific, Patent Document 1 discloses a system that detects the positions of a plurality of persons by a position sensor, detects the ID numbers of optical ID tags applied to the respective persons by an ID sensor, and thereby estimates the positions of the respective persons. The position sensor is, for example, a floor sensor that senses the pressure load of a site on which a person steps. The ID sensor is applied to, for example, the chest of each person and detects an output from an optical ID tag that transmits identification information by flashing of an LED.
Patent Document 1: Japanese Unexamined Patent Application Publication No. 2007-240295

However, because use of a combination of such analysis engines is stereotyped in Patent Document 1 described above, there is a problem that it is impossible to further increase the reliability of an analysis result depending on the situation. That is to say, Patent Document 1 discloses use of a combination of the ID sensor for detecting the position of each person and the position sensor for complementing the reliability of the detected position, but does not disclose use of a combination of other analysis results to obtain a new analysis result. Therefore, there arises a problem that the reliability of an analysis result is considerably low under a certain condition and a problem that versatility is low because it is impossible to execute analysis in response to change of the situation.

SUMMARY

Accordingly, an object of the present invention is to solve the abovementioned problems; decrease of the reliability of an analysis result obtained by integrating the results of analysis by a plurality of analysis engines, and decrease of the versatility of a system that integrates the analysis engines.

An analysis engine control device as an exemplary embodiment of the present invention includes:
an analysis data selecting means for selecting at least two analysis data of a plurality of analysis data that are analysis results obtained by analysis by a plurality of analysis engines, respectively; and
an analysis data integration calculating means for executing new analysis by using the at least two analysis data selected by the analysis data selecting means as integration target analysis data.

The analysis data selecting means is configured to, based on classifications assigned according to one characteristic or each of a plurality of characteristics previously set of the analysis engines, select analysis data obtained by the analysis engines that the classifications are at least partly different from each other, as the integration target analysis data.

Further, a program as another exemplary embodiment of the present invention is a computer program including instructions for causing an information processing device to realize:
an analysis data selecting means for selecting at least two analysis data of a plurality of analysis data that are analysis results obtained by analysis by a plurality of analysis engines, respectively; and
an analysis data integration calculating means for executing new analysis by using the at least two analysis data selected by the analysis data selecting means as integration target analysis data.

The computer program also includes instructions for causing the information processing device to realize that, based on classifications assigned according to one characteristic or each of a plurality of characteristics previously set of the analysis engines, the analysis data selecting means selects analysis data obtained by the analysis engines that the classifications are at least partly different from each other, as the integration target analysis data.

Further, an analysis engine control method as another exemplary embodiment of the present invention includes, by an information processing device:
selecting at least two analysis data of a plurality of analysis data that are analysis results obtained by analysis by a plurality of analysis engines, respectively, and executing new analysis by using the selected at least two analysis data as integration target analysis data; and
in the selecting the analysis data, based on classifications assigned according to one characteristic or each of a plurality of characteristics previously set of the analysis engines, selecting analysis data obtained by the analysis engines that the classifications are at least partly different from each other, as the integration target analysis data.

With the configurations as described above, the present invention can achieve increase of the reliability of an analysis result obtained by integrating the results of analysis by a plurality of analysis engines and increase of the versatility of a system that integrates the analysis engines.

BRIEF DESCRIPTION OF DRAWINGS

FIG. 2 is a diagram showing an example of data stored in an analysis engine meta-information table disclosed in FIG. 1;

FIG. 5 is a diagram showing an aspect of selection of analysis data by the analysis engine control device disclosed in FIG. 1;

FIG. 6 is a flowchart showing the operation of the analysis engine control device disclosed in FIG. 1; and FIG. 7 is a block diagram showing a configuration of an analysis engine control device in Supplementary Note 1 of the present invention.

EXEMPLARY EMBODIMENTS

<First Exemplary Embodiment>

Figure 1:
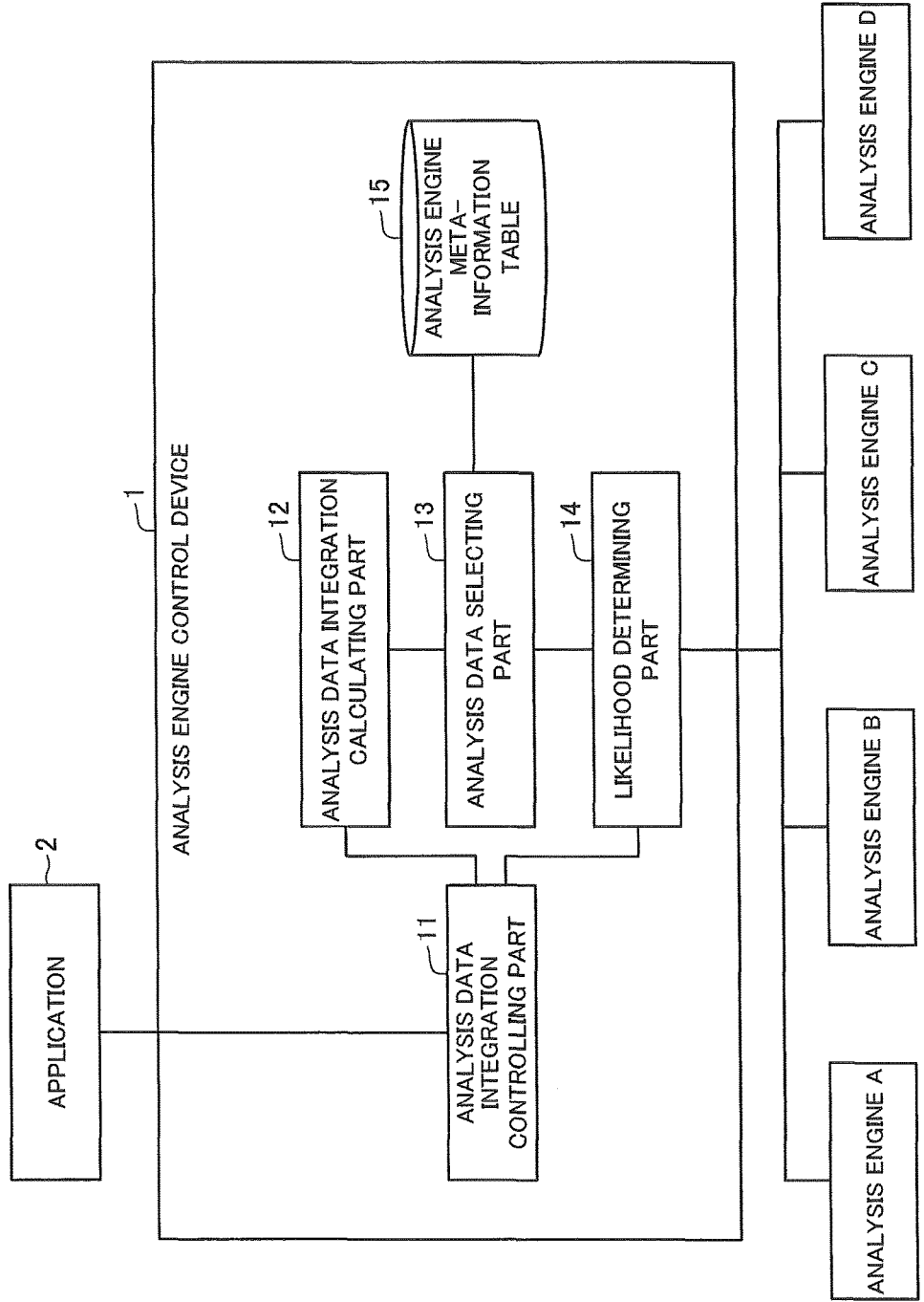
FIG. 1 is a block diagram showing a configuration of an analysis engine control device in a first exemplary embodiment of the present invention.

Referring to FIGS. 1 to 6, a first exemplary embodiment of the present invention will be described. FIGS. 1 and 2 are diagrams for describing a configuration of an analysis engine control device. FIGS. 3 to 6 are diagrams for describing an operation of the analysis engine control device.

[Configuration]

An analysis engine control device 1 in this exemplary embodiment is an information processing device including an arithmetic device and a storage device, and is configured by one or a plurality of information processing devices. As shown in FIG. 1, the analysis engine control device 1 is connected to an application 2 installed in a client device and a plurality of analysis engines A, B, C and D. The analysis engine control device 1 has a function of, in response to an analysis processing request given by the application 2, controlling the operations of the analysis engines A, B, C and D to execute analysis processing and returning the results of the analysis processing to the application 2. The number of the analysis engines A, B, C, D connected to the analysis engine control device 1 is not limited to four.

In this exemplary embodiment, for example, "analysis engine A" is an analysis engine that analyzes location information of an object by using information of "camera image" as analysis target data (an information source). "Analysis engine B" is an analysis engine that analyzes location information of an object by using information of "thermography" as analysis target data. "Analysis engine C" is an analysis engine that analyzes location information of an object by using information of "RFID (Radio Frequency IDentification)" as analysis target data. "Analysis engine D" is an analysis engine that analyzes location information of an object by using information of "UWB (Ultra Wide Band)" as analysis target data. However, the analysis engines are not limited to those described above.

As shown in FIG. 1, the analysis engine control device 1 includes an analysis data integration controlling part 11, an analysis data integration calculating part 12, an analysis data selecting part 13, and a likelihood determining part 14, which are structured by installation of a program into the arithmetic device. The program installed into the arithmetic device is recorded in a predetermined storage device, or recorded in a computer-readable recording medium. For example, the recording medium is a portable medium such as a flexible disk, an optical disk, a magneto-optical disk, and a semiconductor memory.

Further, the analysis engine control device 1 includes an analysis engine meta-information table 15 stored in the storage device. The analysis engine meta-information table 15 is not necessarily stored in the storage device included in the analysis engine control device 1. The analysis engine meta-information table 1 may be stored in a storage device connected by a communication cable or wireless communication, or may be stored in a storage device connected via the Internet.

The analysis data integration controlling part 11 accepts an analysis processing request given by the application 2. This analysis processing request contains information that indicates the content of a requested "analysis processing result," and information that indicates "designated likelihood value" designating reliability indicating the probability of the analysis processing result requested for "analysis process result." For example, "analysis processing result" described above is "location information of an object," and "designated likelihood value" described above is "reliability value" requested for the object location information obtained in the analysis processing. However, the information included in the analysis processing request is not limited to the information described above. Then, the analysis data integration controlling part 11 notifies the likelihood determining part 14 of the information on the analysis processing request accepted from the application 2.

The likelihood determining part 14 (an engine information acquiring means), in response to the analysis processing request given by the analysis data integration controlling part 11, is notified of the result of analysis processing by each of the analysis engines and is also notified of "likelihood information" indicating the reliability of the analysis processing result. This "likelihood information" is a value that is calculated based on the content of processing, the condition of processing and so on in analysis processing on the analysis target data by each of the analysis engines and that indicates reliability as the probability of the analysis processing result. For example, as described in Japanese Patents Nos. 3903783, 4093026 and 4158937, the likelihood information is a value calculated together with an analysis processing result. However, the likelihood information is not limited to the value calculated as described above, and may be, for example, a value previously set for each of the analysis engines.

Further, the likelihood determining part 14 is notified of the analysis processing result and the likelihood information from each of the analysis engines, and is also notified of information indicating an information source that is the analysis target data analyzed for obtaining the analysis result. For example, the analysis target data (information source) of "analysis engine A" is "camera image," and the likelihood determining part 14 is also notified of the information.

The likelihood determining part 14 stores, for each of the analysis engines, analyzability information indicating the type of an analysis processing result on which the analysis engine can execute analysis processing and identification information specifying the analysis engine in association with each other, for example. Based on the stored analyzability information of the analysis engines, the likelihood determining part 14 acquires the analysis processing result, the likelihood information and the information on the analysis target data (information source) from the analysis engine corresponding to the requested analysis processing result given by the analysis data integration controlling part 11 as described above.

Further, the likelihood determining part 14 examines whether the likelihood information acquired from each of the analysis engines exceeds "designated likelihood value" given by the analysis data integration controlling part 11. That is to say, the likelihood determining part 14 determines whether the largest likelihood information value of the likelihood information acquired from the respective analysis engines exceeds "designated likelihood value" or not.

In a case where the largest likelihood information value of the likelihood information acquired from the respective analysis engines exceeds "designated likelihood value" as a result of the abovementioned determination, the likelihood determining part 14 notifies the application 2 of analysis data that is the analysis processing result outputted by the analysis engine notifying of the exceeding likelihood information, via the analysis data integration controlling part 11. Thus, a response to the analysis processing request made by the application 2 is offered.

On the other hand, in a case where none of the likelihood information acquired from the respective analysis engines exceeds "designated likelihood value" given by the analysis data integration controlling part 11, the likelihood determining part 14 instructs the analysis data selecting part 13 to select analysis data that are the results of analysis processing by at least two analysis engines and that become integration target analysis data to be integrated for calculating a new analysis processing result.

The analysis data selecting part 13 (an analysis data selecting means) refers to the analysis engine meta-information table 15 and selects, as the abovementioned integration target analysis data, analysis data that are the results of analysis processing by at least two analysis engines among the results of analysis processing by the plurality of analysis engines. Herein, a description will be made by illustrating a case of selecting two analysis data as an example.

To be specific, the analysis data selecting part 13 first selects, as first integration target analysis data, analysis data obtained by an analysis engine (a first analysis engine) notifying of the largest likelihood information value among the values of the likelihood information acquired from the respective analysis engines. The analysis data selecting part 13 then selects, as second integration target analysis data, analysis data obtained by another analysis engine (a second analysis engine) for which a classification different from a classification previously set according to the characteristic of the first analysis engine is set.

Herein, "classifications" in accordance with the characteristics of the analysis engines represent classifications obtained by dividing analysis target data to be analyzed by the analysis engines, that is, information sources for executing analysis processing into previously set signal types, for example. In this exemplary embodiment, five "classifications" including "optical signal," "radio signal," "acoustic signal," "temperature signal" and "acceleration signal" are set as the signal types of the analysis target data (information sources) of the analysis engines, and the degrees of dependence on the signal types (signal dependence degrees) representing degrees that the analysis target data of the respective analysis engines belong to the signal types are stored in the analysis engine meta-information table 15.

For example, in the analysis engine meta-information table 15 (an analysis engine characteristic table), the following values are stored as the signal dependence degrees of the respective analysis target data (information sources). Because the analysis target data "camera image" analyzed by the analysis engine A depends on 100% the signal type "optical signal," a value "1.0" is stored. Because the analysis target data "thermography" analyzed by the analysis engine B depends on 20% the signal type "optical signal" and depends on 80% the signal type "temperature signal," a value "0.2" and a value "0.8" are stored for the respective signal types. Because the analysis target data "RFID" and "UWB" analyzed by the analysis engine C and the analysis engine D, respectively, depends on 100% the signal type "radio signal," a value "1.0" is stored for each. Although the signal dependence degrees on the respective signal types of other analysis target data (information sources) are stored in the example shown in FIG. 2, the analysis engine meta-information table 15 is not limited to the example shown in FIG. 2.

The analysis data selecting part 13 refers to the analysis engine meta-information table 15 described above and selects, as the second integration target analysis data, an analysis result obtained by an analysis engine analyzing analysis target data (information source) whose signal dependence degree is more different from that of the analysis target data (information source) of the analysis engine analyzing the first integration target analysis data, that is, an analysis result obtained by an analysis engine analyzing analysis target data (information source) which is highly independent with respect to the signal types. For example, the analysis data selecting part 13 selects, as the second integration target analysis data, an analysis result obtained by another analysis engine analyzing another analysis target data whose signal dependence degree does not overlap at all that of the analysis target data (information source) of the analysis engine analyzing the first integration target analysis data.

A case where analysis data obtained by "analysis engine A" is selected as the first integration target analysis data will be considered as an example. In this case, because the signal dependence degree of the analysis target data of "analysis engine A" on "optical signal" is "1.0," the analysis data selecting part 13 selects analysis data obtained by an analysis engine analyzing another analysis target data whose signal dependence degree on "optical signal" is "0." Thus, because the signal dependence degree on "optical signal" of the analysis target data of "analysis engine B" is "0.2," the analysis data selecting part 13 does not select analysis data obtained thereby as the second integration target analysis data. Then, the analysis data selecting part 13 selects analysis data obtained by "analysis engine C" and "analysis engine D." The analysis data selecting part 13 compares likelihood information acquired from the respective analysis engines C and D as described above and selects analysis data whose likelihood information is the highest from among analysis data obtained by the analysis engines C and D, as the second integration target analysis data.

In the above description, analysis data obtained by analysis engines whose analysis target data depend on completely different signal types are selected as integration target analysis data. However, even if the signal dependence degrees of analysis target data of analysis engines partly overlap on the same signal type, in a case where the signal dependence degrees partly depend on different signal types (the signal dependence degrees on different signal types>0), analysis data obtained by the analysis engines may be selected as integration target analysis data. For example, in the above example, if there is not an analysis engine whose analysis target data depends on a completely different signal type from "optical signal" that the analysis target data of "analysis engine A" depends on, analysis data obtained by "analysis engine B" whose analysis target data partly depends on a different signal type "temperature signal" (the degree of dependence is 0.8) may be selected as the second integration target analysis data.

A method of analysis data selection by the analysis data selecting part 13 is not limited to the abovementioned one. For example, the analysis data selecting part 13 may calculate values each obtained by weighing a distance of dependence degree between an analysis engine whose analysis data is selected as the first integration target analysis data and another analysis engine on a signal type dependence degree space, which is a classification dependence degree space where the axes of the respective signal types are set and the degrees of dependence on the respective signals are values in the respective axis directions, by a value of likelihood information of the other analysis engine, and select analysis data obtained by the other analysis engine that the value is the largest, as the second integration target analysis data. The selection process will be specifically described at the time of description of an operation later.

The analysis data selecting part 13 does not need to select analysis data obtained by two analysis engines at all times, and may select three or more analysis data as integration target analysis data. In this case, as mentioned above, the analysis data selecting part 13 can select at least two analysis data obtained by analysis engines whose characteristic classifications are at least partly different.

Further, in the above description, "classifications" of characteristics of analysis engines stored in the analysis engine meta-information table 15 are signal types of analysis target data (information sources). However, such "classifications" may be classifications depending on other characteristics of analysis engines. For example, such "classifications" may be classifications depending on sensors acquiring analysis target data of analysis engines, classifications depending on measurement values of statuses or environments of acquisition of analysis target data, classifications depending on analysis processing steps (algorithms) of analysis engines, or the like.

The analysis data selecting part 13 passes the selected integration target analysis data to the analysis data integration calculating part 12. Then, the analysis data integration calculating part 12 (an analysis data integration calculating means) integrates the selected integration target analysis data to execute new analysis processing, and notifies the application 2 of the result of integration analysis processing via the analysis data integration controlling part 11. Thus, a response to the analysis processing request made by the application 2 is offered.

At this moment, for example, the analysis data integration calculating part 12 calculates an integration analysis processing result based on integration target analysis data weighed by multiplying each integration target analysis data by the value of likelihood information given by an analysis engine having analyzed the integration target analysis data. However, the integration analysis processing by the analysis data integration calculating part 12 is not limited to the abovementioned one.

[Operation]

Next, referring to FIGS. 3 to 6, an operation of the analysis engine control device 1 will be described. Also, a specific example will be described. Herein, it is assumed that the respective analysis engines A, B, C and D are the same as described above and the data disclosed in FIG. 2 is stored in the analysis engine meta-information table 15.

Figure 3:
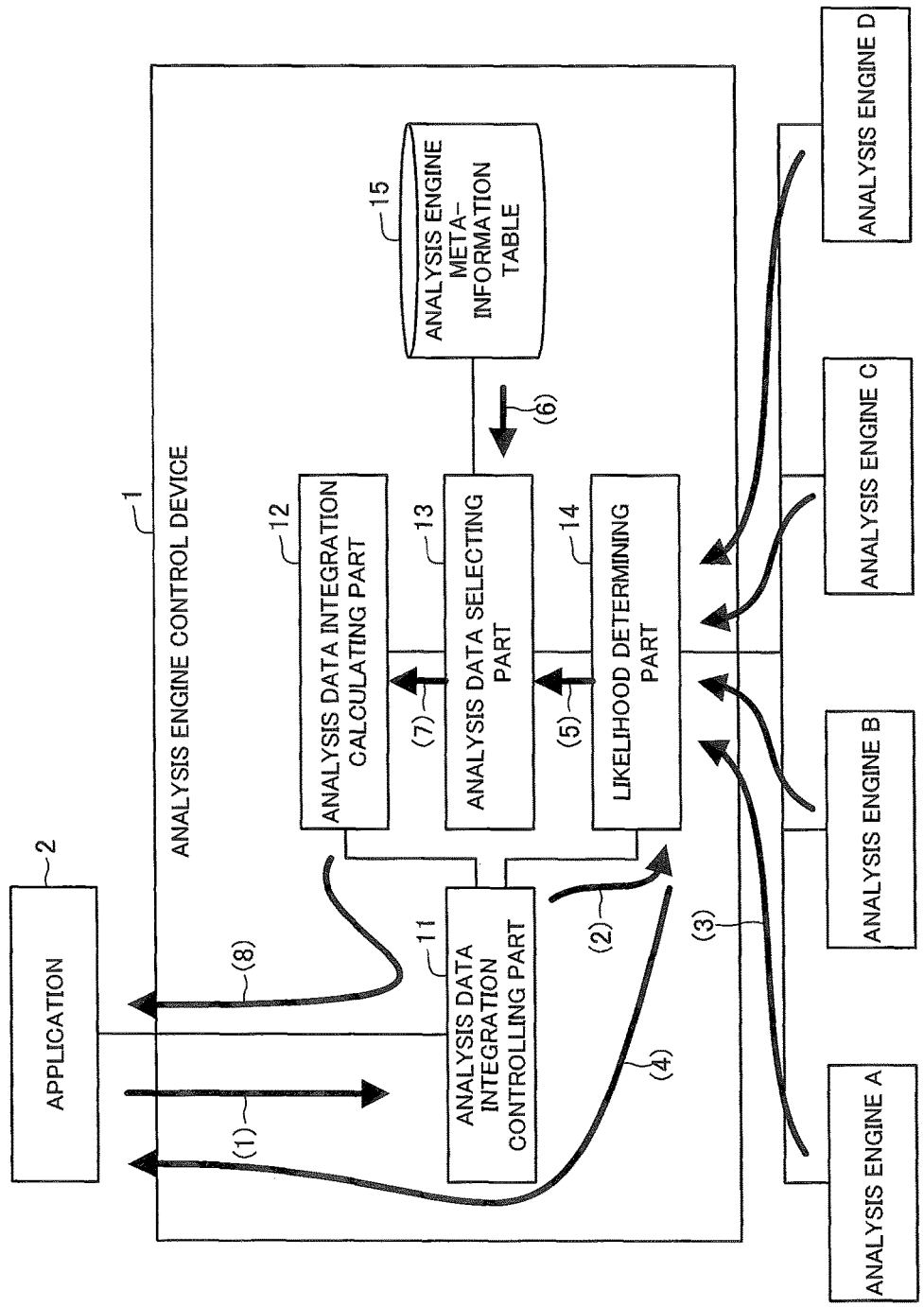
FIG. 3 is a description diagram showing an aspect of an operation of the analysis engine control device disclosed in FIG. 1.
Figure 4:
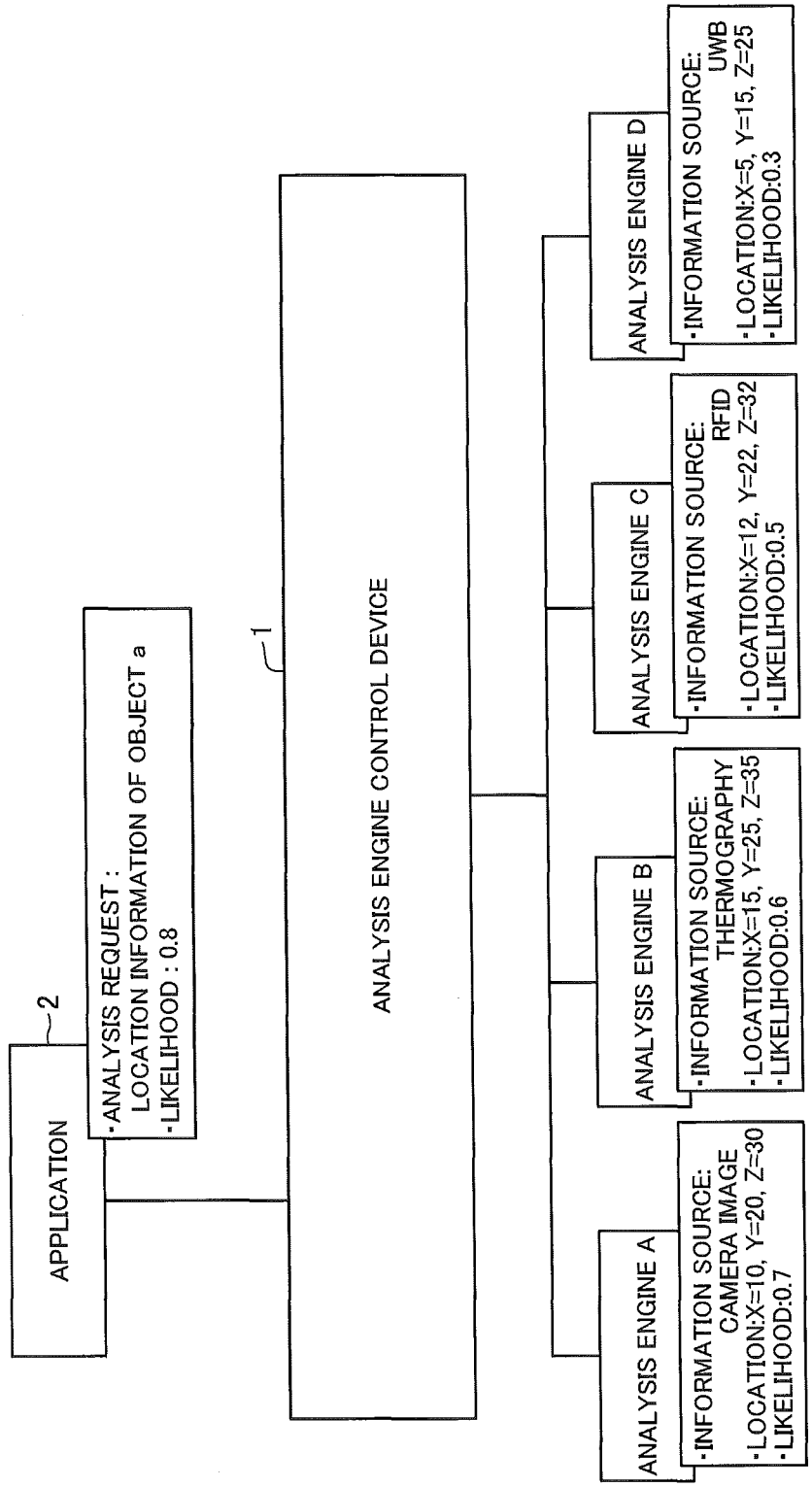
FIG. 4 is a description diagram showing a specific example of the operation of the analysis engine control device disclosed in FIG. 1.

First, the analysis data integration controlling part 11 of the analysis engine control device 1 accepts an analysis processing request from the application 2 (see (1) in FIG. 3, step S1 in FIG. 6). Herein, it is assumed that "object a's location information whose likelihood is 0.8 or more" is requested as an analysis processing result as shown in FIG. 4. Then, the analysis data integration controlling part 11 notifies the likelihood determining part 14 of information of the analysis processing request accepted from the application 2 (see (2) in FIG. 3, step S2 in FIG. 6). Specifically, a value of "likelihood 0.8" is set as "designated likelihood value" in the likelihood determining part 14.

Subsequently, in response to the analysis processing request for "object a's location information whose likelihood is 0.8 or more" given by the analysis data integration controlling part 11, the likelihood determining part 14 specifies analysis engines outputting "object a's location information" as the analysis processing result, and collects "location information" (analysis data) as the analysis processing results and "likelihood information" representing reliability thereof from the analysis engines (see (3) in FIG. 3, step S3 in FIG. 6). Herein, it is assumed that the likelihood determining part 14 collects location information as the analysis processing results and likelihood information thereof from the respective analysis engines A, B, C and D as shown in FIG. 4. At this moment, the likelihood determining part 14 also collects information specifying analysis target data (an information source) used for analysis processing from each of the analysis engines. However, information specifying analysis target data (an information source) may be previously stored in the analysis engine control device 1 for each of the analysis engines.

Subsequently, the likelihood determining part 14 examines whether "likelihood information" acquired from each of the analysis engines exceeds "designated likelihood value" given by the analysis data integration controlling part 11 (step S4 in FIG. 6). In a case where, as a result of determination of likelihood values, the largest value of the values of the likelihood information acquired from the respective analysis engines exceeds "designated likelihood value 0.8" (Yes in step S4 in FIG. 6), the likelihood determining part 14 notifies the application 2 of the analysis processing result outputted by the analysis engine having notified of the exceeding likelihood information, via the analysis data integration controlling part 11 (see (4) in FIG. 3, step S7 in FIG. 6). Thus, a response to the analysis processing request made by the application 2 is offered.

In this exemplary embodiment, however, none of the likelihood information acquired from the respective analysis engines exceed "designated likelihood value 0.8" given by the analysis data integration controlling part 11 (No in step S4 in FIG. 6), the likelihood determining part 14 instructs the analysis data selecting part 13 to select analysis data that are the analysis processing results obtained by two analysis engines and are to become integration target analysis data to be integrated for calculating a new analysis processing result (see (5) in FIG. 3).

Then, the analysis data selecting part 13 refers to the analysis engine meta-information table 15 (see (6) in FIG. 3) and selects, as integration target analysis data, analysis data that are analysis processing results obtained by two analysis engines among the analysis processing results obtained by the analysis engines A, B, C and D (step S5).

To be specific, first, the analysis data selecting part 13 selects, as first integration target analysis data, "location information: X=10, Y=20, Z=30" that is analysis data obtained by "analysis engine A" from which the largest value "0.7" of the values of likelihood information acquired by the respective analysis engines is acquired. Then, the analysis selecting part 13 selects another analysis engine that analyzes analysis target data (an information source) having high independence of the signal classification of "camera image" that is analysis target data (an information source) of the analysis engine A. Herein, the analysis selecting part 13 calculates values by executing the following arithmetic expressions on the other analysis engines B, C and D with respect to the analysis engine A, and selects analysis data obtained by the analysis engine C from which the largest value is obtained, as second integration target analysis data (step S5 in FIG. 6).

Analysis engine $B$: $((1.0-0.2)^2+0.8^2)\times 0.6=0.768$

Analysis engine $C$: $((1.0-0.0)^2+1.0^2)\times 0.5=1.0$

Analysis engine $D$: $((1.0-0.0)^2+1.0^2)\times 0.3=0.6$

In each of the above arithmetic expressions, first, on a space with the axes of the respective signal types (optical signal, temperature signal, radio signal) set shown in FIG. 5, the square of a distance of degrees of dependence on the respective signal classifications between the analysis engine A and each of the other analysis engines B, C and D is obtained. In FIG. 5, an arrow A-B represents a distance of signal dependence degrees between the analysis engine A and the analysis engine B, and an arrow A-C represents a distance of signal dependence degrees between the analysis engine A and the analysis engine C. Then, the squares of the distances of signal dependence degrees between the analysis engines are multiplied and weighed by the likelihood information of the analysis engines B, C and D, respectively. As the result value is larger, it can be determined that analysis target data (an information source) of the other analysis engine has higher independence of the signal classification "camera image" that is the analysis target data (information source) of the analysis engine A selected as the first integration target analysis data. Therefore, in the above example, the analysis data selecting part 13 selects "location information: X=12, Y=22, Z=32" that is analysis data obtained by "analysis engine C" as the second integration target analysis data. Thus, analysis data whose signal classification is completely different from that of the analysis data obtained by the analysis engine A is selected.

After that, the analysis data selecting part 13 passes the selected integration target analysis data to the analysis data integration calculating part 12 (see (7) in FIG. 3). Then, the analysis data integration calculating part 12 integrates the selected integration target analysis data to execute new analysis processing, and notifies the application 2 of the result of integration analysis processing via the analysis data integration controlling part 11 (see (8) in FIG. 3, step S6 in FIG. 6). Thus, a response to the analysis processing request made by the application 2 is offered.

At this moment, for example, the analysis data integration calculating part 12 weighs the respective location information of the respective integration target analysis data by the likelihood information of the respective analysis engines, and calculates location information integrated by centroid calculation thereof. That is to say, the analysis data integration calculating part 12 executes the following calculation by using "location information: X=10, Y=20, Z=30" and "likelihood: 0.7" obtained from "analysis engine A" and "location information: X=12, Y=22, Z=32" and "likelihood: 0.5" obtained from "analysis engine C," and calculates integrated "location information: X=10.83, Y=20.83, Z=30.83" of the respective coordinates.

$X$-coordinate: $(10\times0.7+12\times0.5)/(0.7+0.5)=10.83$ $Y$-coordinate: $(20\times0.7+22\times0.5)/(0.7+0.5)=20.83$ $Z$-coordinate: $(30\times0.7+32\times0.5)/(0.7+0.5)=30.83$ In the above example, because the signal classifications of the information sources of "analysis engine A" and "analysis engine C" are "optical signal" and "radio signal" and are different from each other, it is possible to obtain integration analysis data which are highly independent of each other and highly reliable.

As a comparison with the above example, a case of selecting analysis data obtained by "analysis engine A" and analysis data obtained by "analysis engine B" whose "likelihood information" is the second highest after that of "analysis engine A" as integration target analysis data will be considered. In this case, "likelihood information" of "analysis engine B" is high, but the information source of "analysis engine B" also depends on "optical signal" that is a signal classification on which the information source of "analysis engine A" depends, so that the reliability of both the analysis data may become low in an environment that it is difficult to acquire "optical signal."

Thus, according to the present invention, the results of analysis by analysis engines that are highly independent of each other are selected and integrated, so that it is possible to increase the reliability of an analysis result that is a combination of analysis results obtained from a plurality of analysis engines. Moreover, because it is possible to properly select analysis data of analysis engines to be integrated, it is possible to realize analysis processing according to situations, and it is possible to increase the versatility of the system.

<Supplementary Notes>

The whole or part of the exemplary embodiments disclosed above can be described as, but not limited to, the following supplementary notes.

(Supplementary Note 1)

An analysis engine control device 100 comprising:

an analysis data selecting means 102 for selecting at least two analysis data of a plurality of analysis data that are analysis results obtained by analysis by a plurality of analysis engines 200, respectively; and an analysis data integration calculating means 101 for executing new analysis by using the at least two analysis data selected by the analysis data selecting means 102 as integration target analysis data, wherein the analysis data selecting means 102 is configured to, based on classifications assigned according to one characteristic or each of a plurality of characteristics previously set of the analysis engines 200, select analysis data obtained by the analysis engines 200 that the classifications are at least partly different from each other, as the integration target analysis data.

(Supplementary Note 2)

The analysis engine control device according to Supplementary Note 1, wherein:

the classifications according to the characteristic of the analysis engines are classifications corresponding to signal types of analysis target data to be analyzed by the analysis engines; and the analysis data selecting means is configured to select analysis data obtained by the analysis engines that the classifications corresponding to the signal types of the analysis target data are at least partly different from each other, as the integration target analysis data.

(Supplementary Note 3)

The analysis engine control device according to Supplementary Note 1 or 2, comprising an analysis engine information acquiring means for acquiring likelihood information indicating reliability of the analysis results outputted by the analysis engines, wherein the analysis data selecting means is configured to select analysis data obtained by the analysis engines as the integration target analysis data based on the likelihood information acquired from the analysis engines by the analysis engine information acquiring means.

(Supplementary Note 4)

The analysis engine control device according to Supplementary Note 3, wherein:

the analysis engine information acquiring means is configured to determine whether at least one of values of the likelihood information acquired from the analysis engines exceeds a designated likelihood value that is a previously designated likelihood value; and the analysis data selecting means is configured to: in a case where any of the values of the likelihood information acquired from the analysis engines by the analysis engine information acquiring means exceeds the designated likelihood value, select analysis data obtained by the analysis engines that the likelihood information exceeding the designated likelihood value is acquired, as the integration target analysis data; and in a case where none of the values of the likelihood information acquired from the analysis engines by the analysis engine information acquiring means exceed the designated likelihood value, select analysis data obtained by the analysis engines that the classifications are at least partly different from each other, as the integration target analysis data.

(Supplementary Note 5)

The analysis engine control device according to Supplementary Note 4, wherein the analysis data selecting means is configured to, in a case where none of the values of the likelihood information acquired from the analysis engines by the analysis engine information acquiring means exceed the designated likelihood value, select analysis data obtained by one of the analysis engines that the value of the likelihood information acquired from the one analysis engine is largest, and analysis data obtained by another of the analysis engines that the classification is at least partly different from that of the one analysis engine, as the integration target analysis data.

(Supplementary Note 6)

The analysis engine control device according to Supplementary Note 5, wherein the analysis data selecting means is configured to, in a case where none of the values of the likelihood information acquired from the analysis engines by the analysis engine information acquiring means exceed the designated likelihood value, select analysis data obtained by one of the analysis engines that the value of the likelihood information acquired from the one analysis engine is largest, and analysis data obtained by another of the analysis engines that the likelihood information is largest among others of the analysis engines that the classifications are at least partly different from that of the one analysis engine, as the integration target analysis data.

(Supplementary Note 7)

The analysis engine control device according to Supplementary Note 5, wherein the analysis data selecting means is configured to, in a case where none of the values of the likelihood information acquired from the analysis engines by the analysis engine information acquiring means exceed the designated likelihood value: select analysis data obtained by one of the analysis engines that the value of the likelihood information acquired from the one analysis engine is largest, as the integration target analysis data; and also select analysis data obtained by another of the analysis engines that a value obtained by weighing a value based on a distance by the value of the likelihood information obtained from the other analysis engine is largest, as the integration target analysis data, the distance being a distance between the selected one analysis engine and the selected other analysis engine in a classification dependence degree space in which classification dependence degrees indicating degrees of dependence of the analysis engines for the respective classifications are values in respective axis directions.

(Supplementary Note 8)

The analysis engine control device according to any of Supplementary Notes 1 to 7, wherein the analysis data integration calculating means is configured to execute new analysis by using, as the integration target analysis data, values obtained by weighing analysis data selected by the analysis data selecting means by the values of the likelihood information obtained from the analysis engines outputting the selected analysis data.

(Supplementary Note 9)

A computer program comprising instructions for causing an information processing device to realize:

an analysis data selecting means for selecting at least two analysis data of a plurality of analysis data that are analysis results obtained by analysis by a plurality of analysis engines, respectively; and an analysis data integration calculating means for executing new analysis by using the at least two analysis data selected by the analysis data selecting means as integration target analysis data, the computer program also comprising instructions for causing the information processing device to realize that, based on classifications assigned according to one characteristic or each of a plurality of characteristics previously set of the analysis engines, the analysis data selecting means selects analysis data obtained by the analysis engines that the classifications are at least partly different from each other, as the integration target analysis data.

(Supplementary Note 10)

The computer program according to Supplementary Note 9, wherein:

the classifications according to the characteristic of the analysis engines are classifications corresponding to signal types previously set of analysis target data to be analyzed by the analysis engines; and the analysis data selecting means is configured to select analysis data obtained by the analysis engines that the classifications corresponding to the signal types of the analysis target data are at least partly different from each other, as the integration target analysis data.

(Supplementary Note 11)

An analysis engine control method comprising, by an information processing device:

selecting at least two analysis data of a plurality of analysis data that are analysis results obtained by analysis by a plurality of analysis engines, respectively, and executing new analysis by using the selected at least two analysis data as integration target analysis data; and in the selecting the analysis data, based on classifications assigned according to one characteristic or each of a plurality of characteristics previously set of the analysis engines, selecting analysis data obtained by the analysis engines that the classifications are at least partly different from each other, as the integration target analysis data.

(Supplementary Note 12)

The analysis engine control method according to Supplementary Note 11, wherein:

the classifications according to the characteristic of the analysis engines are classifications corresponding to signal types of analysis target data to be analyzed by the analysis engines; and in the selecting the analysis data, analysis data obtained by the analysis engines that the classifications corresponding to the signal types of the analysis target data are at least partly different from each other are selected as the integration target analysis data.

In the respective exemplary embodiments, the program is stored in the storage device, or recorded on a computer-readable recording medium. For example, the recording medium is a portable medium such as a flexible disk, an optical disk, a magneto-optical disk and a semiconductor memory.

Although the present invention is described above by referring to the exemplary embodiments, the present invention is not limited to the exemplary embodiments described above. The configurations and details of the present invention can be modified in various manners that can be understood by one skilled in the art within the scope of the present invention.

The present invention is based upon and claims the benefit of priority from Japanese patent application No. 2011-145069, filed on Jun. 30, 2011, the disclosure of which is incorporated herein in its entirety by reference.

DESCRIPTION OF REFERENCE NUMERALS 1 analysis engine control device
2 application
11 analysis data integration controlling part
12 analysis data integration calculating part
13 analysis data selecting part
14 likelihood determining part
15 analysis engine meta-information table
A, B, C, D analysis engine
100 analysis engine control device
101 analysis data integration calculating means
102 analysis data selecting means
200 analysis engine

The invention claimed is:

1. An analysis engine control device comprising:
an analysis data selecting unit for selecting at least two analysis data of a plurality of analysis data that are analysis results obtained by analysis by a plurality of analysis engines, respectively;
an analysis data integration calculating unit for executing new analysis by using the at least two analysis data selected by the analysis data selecting unit as integration target analysis data,
wherein the analysis data selecting unit is configured to, based on classifications assigned according to one characteristic or each of a plurality of characteristics of the analysis engines, select analysis data obtained by the analysis engines that the classifications are at least partly different from each other, as the integration target analysis data; and
an analysis engine information acquiring unit for acquiring likelihood information indicating reliability of the analysis results outputted by the analysis engines,
wherein the analysis data selecting unit is configured to select analysis data obtained by the analysis engines as the integration target analysis data based on the likelihood information acquired from the analysis engines by the analysis engine information acquiring unit,
wherein:
the analysis engine information acquiring unit is configured to determine whether at least one of values of the likelihood information acquired from the analysis engines exceeds a designated likelihood value that is a previously designated likelihood value; and
the analysis data selecting unit is configured to:
in a case where any of the values of the likelihood information acquired from the analysis engines by the analysis engine information acquiring unit exceeds the designated likelihood value, select analysis data obtained by the analysis engines that the likelihood information exceeding the designated likelihood value is acquired, as the integration target analysis data; and
in a case where none of the values of the likelihood information acquired from the analysis engines by the analysis engine information acquiring unit exceed the designated likelihood value, select analysis data obtained by the analysis engines that the classifications are at least partly different from each other, as the integration target analysis data.

2. The analysis engine control device according to claim 1, wherein:
the classifications according to the characteristic of the analysis engines are classifications corresponding to signal types of analysis target data to be input to and analyzed by the analysis engines; and
the analysis data selecting unit is configured to select analysis data obtained by the analysis engines that the classifications corresponding to the signal types of the analysis target data are at least partly different from each other, as the integration target analysis data.

3. The analysis engine control device according to claim 1, wherein the analysis data selecting unit is configured to, in a case where none of the values of the likelihood information acquired from the analysis engines by the analysis engine information acquiring unit exceed the designated likelihood value, select analysis data obtained by one of the analysis engines that the value of the likelihood information acquired from the one analysis engine is largest, and analysis data obtained by another of the analysis engines that the classification is at least partly different from that of the one analysis engine, as the integration target analysis data.

4. The analysis engine control device according to claim 3, wherein the analysis data selecting unit is configured to, in a case where none of the values of the likelihood information acquired from the analysis engines by the analysis engine information acquiring unit exceed the designated likelihood value, select analysis data obtained by one of the analysis engines that the value of the likelihood information acquired from the one analysis engine is largest, and analysis data obtained by another of the analysis engines that the likelihood information is largest among others of the analysis engines that the classifications are at least partly different from that of the one analysis engine, as the integration target analysis data.

5. The analysis engine control device according to claim 3, wherein the analysis data selecting unit is configured to, in a case where none of the values of the likelihood information acquired from the analysis engines by the analysis engine information acquiring unit exceed the designated likelihood value: select analysis data obtained by one of the analysis engines that the value of the likelihood information acquired from the one analysis engine is largest, as the integration target analysis data; and also select analysis data obtained by another of the analysis engines that a value obtained by weighing a value based on a distance by the value of the likelihood information obtained from the other analysis engine is largest, as the integration target analysis data, the distance being a distance between the selected one analysis engine and the selected other analysis engine in a classification dependence degree space in which classification dependence degrees indicating degrees of dependence of the analysis engines for the respective classifications are values in respective axis directions.

6. The analysis engine control device according to claim 1, wherein the analysis data integration calculating unit is configured to execute new analysis by using, as the integration target analysis data, values obtained by weighing analysis data selected by the analysis data selecting unit by the values of the likelihood information obtained from the analysis engines outputting the selected analysis data.

7. A non-transitory computer-readable medium for storing a computer program comprising instructions for causing an information processing device to realize:
an analysis data selecting unit for selecting at least two analysis data of a plurality of analysis data that are analysis results obtained by analysis by a plurality of analysis engines, respectively;
an analysis data integration calculating unit for executing new analysis by using the at least two analysis data selected by the analysis data selecting unit as integration target analysis data,
wherein based on classifications assigned according to one characteristic or each of a plurality of characteristics of the analysis engines, the analysis data selecting unit selects analysis data obtained by the analysis engines that the classifications are at least partly different from each other, as the integration target analysis data; and
an analysis engine information acquiring unit for acquiring likelihood information indicating reliability of the analysis results outputted by the analysis engines,
wherein the analysis data selecting unit is configured to select analysis data obtained by the analysis engines as the integration target analysis data based on the likelihood information acquired from the analysis engines by the analysis engine information acquiring unit,
wherein:
the analysis engine information acquiring unit is configured to determine whether at least one of values of the likelihood information acquired from the analysis engines exceeds a designated likelihood value that is a previously designated likelihood value; and
the analysis data selecting unit is configured to:
in a case where any of the values of the likelihood information acquired from the analysis engines by the analysis engine information acquiring unit exceeds the designated likelihood value, select analysis data obtained by the analysis engines that the likelihood information exceeding the designated likelihood value is acquired, as the integration target analysis data; and
in a case where none of the values of the likelihood information acquired from the analysis engines by the analysis engine information acquiring unit exceed the designated likelihood value, select analysis data obtained by the analysis engines that the classifications are at least partly different from each other, as the integration target analysis data.

8. The non-transitory computer-readable medium storing the computer program according to claim 7, wherein:
the classifications according to the characteristic of the analysis engines are classifications corresponding to signal types of analysis target data to be input to analyzed by the analysis engines; and
the analysis data selecting unit is configured to select analysis data obtained by the analysis engines that the classifications corresponding to the signal types of the analysis target data are at least partly different from each other, as the integration target analysis data.

9. An analysis engine control method comprising, by an information processing device:
selecting at least two analysis data of a plurality of analysis data that are analysis results obtained by analysis by a plurality of analysis engines, respectively, and executing new analysis by using the selected at least two analysis data as integration target analysis data;
in the selecting the analysis data, based on classifications assigned according to one characteristic or each of a plurality of characteristics of the analysis engines, selecting analysis data obtained by the analysis engines that the classifications are at least partly different from each other, as the integration target analysis data; and
acquiring likelihood information indicating reliability of the analysis results outputted by the analysis engines,
wherein the selecting the analysis data comprises to select analysis data obtained by the analysis engines as the integration target analysis data based on the likelihood information acquired from the analysis engines,
wherein:
the acquiring likelihood information comprises to determine whether at least one of values of the likelihood information acquired from the analysis engines exceeds a designated likelihood value that is a previously designated likelihood value; and
wherein the selecting the analysis data further comprises:
in a case where any of the values of the likelihood information acquired from the analysis engines exceeds the designated likelihood value, selecting analysis data obtained by the analysis engines that the likelihood information exceeding the designated likelihood value is acquired, as the integration target analysis data; and
in a case where none of the values of the likelihood information acquired from the analysis engines exceed the designated likelihood value, selecting analysis data obtained by the analysis engines that the classifications are at least partly different from each other, as the integration target analysis data.

10. The analysis engine control method according to claim 9, wherein:
the classifications according to the characteristic of the analysis engines are classifications corresponding to signal types of analysis target data to be input to and analyzed by the analysis engines; and
in the selecting the analysis data, analysis data obtained by the analysis engines that the classifications corresponding to the signal types of the analysis target data are at least partly different from each other are selected as the integration target analysis data.

11. The analysis engine control device according to claim 1, wherein the analysis selecting unit selects the at least two analysis data of different classifications of signal types and integrates the selected data to execute a new analysis.

12. The analysis engine control device according to claim 1, wherein the analysis selecting unit selects the at least two analysis data of different classifications and integrates the selected data to execute a new analysis.

13. The analysis engine control device according to claim 1, wherein the analysis data selecting unit selects at least two analysis data obtained by different analysis engines of different classifications.

* * * * *